Oct. 7, 1952            F. SKAY            2,612,821

UNIVERSAL CENTERING VISE

Filed June 8, 1948

FRANK SKAY
INVENTOR.

BY E. C. McRae
J. R. Faulkner
T. H. Oster

ATTORNEYS

Patented Oct. 7, 1952

2,612,821

UNITED STATES PATENT OFFICE 2,612,821

UNIVERSAL CENTERING VISE

Frank Skay, Detroit, Mich., assignor to Ford Motor Company, Dearborn, Mich., a corporation of Delaware Application June 8, 1948, Serial No. 31,801

1 Claim. (Cl. 90—60)

This invention relates to the machine tool art and is more particularly concerned with a universal centering vise which may be employed to clamp a large variety of articles so that they may be machined in a precisely predetermined position without distortion.

In the routine production of large numbers of duplicate parts, much trouble has been encountered in properly securing parts prior to machining. This difficulty has been especially troublesome in the case of objects which have one dimension relatively large compared to the other dimensions and the weight and the rigidity of the object. Such a part is difficult to secure rigidly without distortion. An example of such a part is a transmission extension housing which is designed to be bolted against the rear face of an automotive transmission housing. This part is an elongated roughly cylindrical casting with relatively thin walls and is belled out at one end. As this part is now produced, the belled end is first faced off in a plane normal to the axis of the casting. In the same operation a bearing seat designed to accommodate an antifriction bearing is machined near the top of the bell. A similar bearing seat must also be provided at the other end of the transmission extension housing and must be coaxial with the bearing located adjacent the bell within very narrow limits. In machining the second bearing seat, it has been the practice to clamp the part on a smooth bearing plate against the faced off surface on the bottom portion of the bell and to properly locate the part by means of holes which are provided in the faced off portion for the purpose of attaching the transmission housing extension to the transmission casing.

Due to the length of this part, there is a substantial distance between the point at which it is initially clamped and located and the point at which machining must be done. To avoid tool chatter it has been found necessary to support this part adjacent the area where the bearing seat is to be machined. This is necessary because the stresses incident to machining will appreciably flex this long thin part. In spite of the exercise of great care in facing off the bell and drilling the locating bolt holes, it will be found that efforts to secure the bearing surface to be machined at the other end of the part prior to machining by any conventional clamping means almost invariably result in a sufficient flexing of the part along its axis to render the axes of the two bearings both eccentric and nonparallel. To correct this type of distortion has required a greater expenditure of time by far than the actual machining operation. This is due to the fact that substantial forces must be employed to clamp the part sufficiently to ensure machining rigidity and unless these forces are precisely applied and balanced, distortion is inevitable. This situation has been aggravated by the fact that it is necessary to clamp upon an unfinished cast surface.

In an effort to overcome this difficulty, applicant has developed the invention described herein which enables the ordinary unskilled or semi-skilled machining operator to quickly clamp articles of this type for the final machining operation without distorting the part beyond close commercial tolerances. Applicant's invention is probably best understood from a consideration of the drawings in which.

Figure 1:
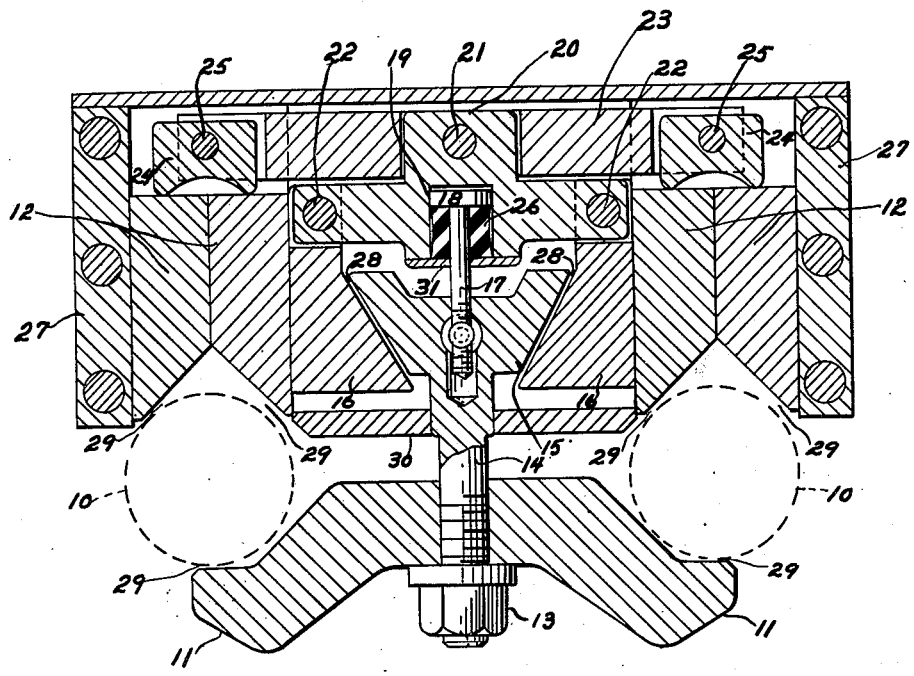
Figure 1 is a sectional view of applicant's universal centering vise in the open position.

In the figures on the drawing, the outline of the parts to be held have been indicated in phantom by the dotted circles 10. In actual operation, the workpieces 10 are clamped between jaws 11 and tapered blocks 12. When the workpieces 10 have been inserted between jaws 11 and tapered blocks 12, as shown in Figure 1, clearances 29 exist between workpieces 10 and the jaws 11 and between the workpieces 10 and tapered blocks 12. When the work has been so positioned, the operator applies a wrench to nut 13 and rotates this nut on bolt 14. Bolt 14 at its inner end merges into keystone member 15, the purpose of which will become apparent as the description proceeds. As nut 13 is rotated, jaws 11 advance toward workpieces 10 until actual contact has been made with workpiece 10 and clearance 29 between workpiece 10 and jaw 11 has disappeared.

Secured to keystone member 15 is rod 17 terminating in head 18 which operates in bore 19 in an inner saddle 20. Bore 19 outside of head 18 is substantially filled with a cylindrical block of elastomer 26 which is also restrained by face plate 31 which is secured to inner saddle 20. At either end of inner saddle 20 are provided pivots 22 to which are secured clamping block 16. In the center portion of inner saddle 20 is located pivot 21 to which is secured outer saddle 23. At each extremity of outer saddle 23 is provided pivots 25 by which are secured rockers 24. These rockers are somewhat bifurcated metal pieces in which each tine normally rests upon a single tapered block 12. Tapered blocks 12 are restrained against lateral movement on one side by clamping blocks 16 and on the other side by side plates 27. These tapered blocks 12 are also guided to some extent by front plate 30.

The operation of this device may be outlined as follows: At the beginning of the operation, the attendant places the workpieces in the position shown in Figure 1; these workpieces having been initially secured at a position remote from that shown in the drawing. In the case of the transmission extension housing, the pieces are initially secured by clamping the faced off end of the bell against a ground plate on the machine. This places the remote and cylindrical end of the part in the desired position as shown in Figure 1. When so secured, it will be noted that substantial clearance 29 exists between the workpieces 10 and jaws 11 and between the workpiece 10 and tapered blocks 12. It is of course desired to clamp workpieces 10 in precisely the position shown in Figure 1 without in any manner moving these workpieces from the position shown. To accomplish this end, nut 13 is rotated on bolt 14 as described above, which causes jaws 11 to advance towards workpieces 10 until the clearances 29 existing between workpieces 10 and jaws 11 have disappeared entirely. When these clearances have disappeared a further rotation of nut 13 will cause keystone member 15, rod 17, inner saddle 20, outer saddle 23, rockers 24, and tapered blocks 12 to advance towards the workpieces 10. At this time attention is particularly invited to the clearances 28 which exist between the nonparallel sides of keystone member 15 and the adjacent sides of clamping blocks 16. Attention is also directed to the fact that movement can be transmitted from rod 17 to inner saddle 20, outer saddle 23, rockers 24, and tapered blocks 12 only by compression of block of elastomer 26. The size and relationship of the various parts including workpieces 10 are so chosen that the tapered blocks 12 will come into contact with the workpieces before the clearances 28 have been obliterated by the outward movement of keystone member 15. When all of the clearances 29 have been eliminated, a metallic contact exists between the workpiece 10 and jaws 11 and between workpieces 10 and each of the tapered blocks 12. However, clearances 28 still exist and further tightening of nut 13 causes a substantial tension to be produced in rod 17 by virtue of compression of block of elastomer 26. This pressure is of course transmitted through inner saddle 20, outer saddle 23 and rockers 24 to tapered blocks 12 and results in a progressively greater pressure against the workpiece. However, it will be noted that this is a balanced pressure and does not tend to move the centers of workpieces 10.

When the proper pressure has been obtained by the compression of block of elastomer 26, the clearances 28 between keystone member 15 and clamping members 16 disappear and a metal-to-metal contact is established between these parts. A further tightening of nut 13 results in a lateral thrust against clamping blocks 16 by the nonparallel faces of keystone member 15. Clamping blocks 16 are of course pivoted at 22 in inner saddle 20 and tend to rotate slightly against the inner faces of inner tapered blocks 12. By virtue of the mechanical advantage inherent in the nut 13 and the slope of the nonparallel sides of keystone member 15, a very high value of lateral thrust against tapered blocks 12 is obtained. This thrust secures tapered blocks 12 in the clamped position without the necessity of applying further direct pressure against workpieces 10.

It is of course vital in setting up a universal centering vise of this type that the proper relationship be maintained between the various parts so that clamping through clamping blocks 16 occurs before excessive pressures are produced by the jaws 11 acting against workpieces 10. It is of course understood that instead of elastomer block 26 other resilient means such as springs could be substituted.

Figure 2:
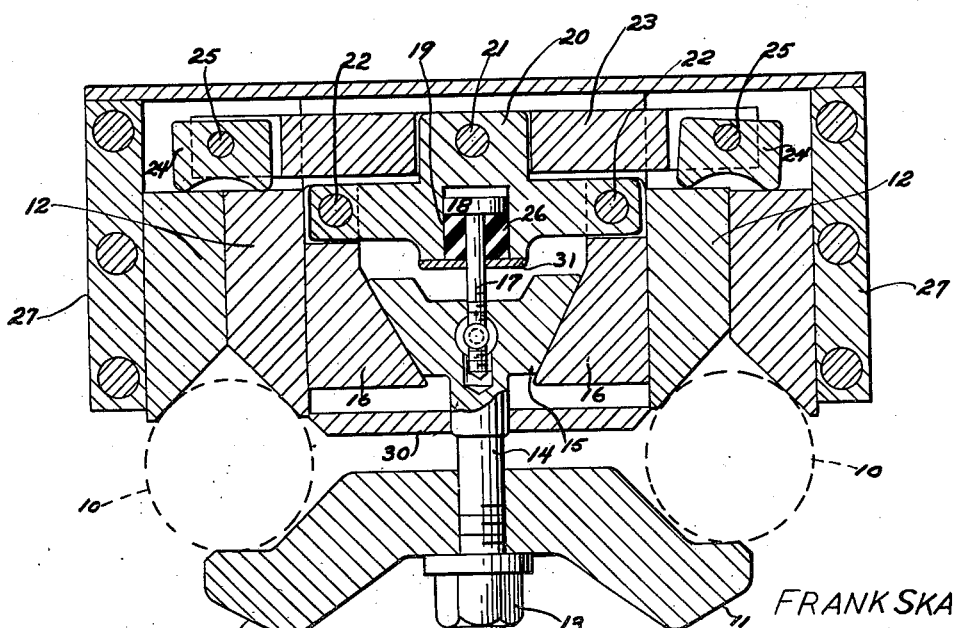
Figure 2 is the same view of applicant's universal centering vise except that the parts have been moved to show this centering vise in the closed or working position and in which one of the parts to be clamped is eccentric.

Attention is invited to Figure 2 in which the action of this device is illustrated when the workpieces are eccentric or of nonuniform size. The left-hand workpiece in Figure 2 is of the desired size and shape and concentric with the normal position of the universal centering vise. It will be noted that each of the left-hand tapered blocks 12 have advanced to the same degree and that left-hand rocker 24 has its parts substantially aligned with the remainder of the device. The right-hand workpiece 10, shown in Figure 2, is not of the desired regular shape and size but is, nevertheless, capable of being clamped without difficulty in applicant's device. In this case, the right-hand tapered block 12 has advanced much further than the left-hand block of the right-hand tapered blocks 12. This is possible due to the fact that rockers 24 are pivotally mounted on outer saddle 23 and also because outer saddle 23 is pivoted onto inner saddle 20. By virtue of this type of construction, it will be seen that applicant is enabled to clamp without adjustment and in a precisely predetermined position all similar parts that are within ordinary commercial limits without the necessity of resorting to precision measurements or exacting machining operations.

Applicant's invention has been described specifically with regard to a clamping device capable of simultaneously securing two parts to be machined. It is to be understood that the invention is not so limited, but can by the exercise of ordinary mechanical skill be readily adapted to the clamping of a single part or more than two parts.

I claim as my invention:

An apparatus for clamping rough castings comprising a bolt with a trapezoidal shaped head, a nut threaded on said bolt, a clamping jaw actuated by the nut, a headed rod connected to the trapezoidal shaped head, an elastomer member surrounding the headed rod adjacent the head of this rod, further clamping jaws opposite the first recited clamping jaw which are actuated by the bolt through the elastomer member and a linkage, and a clamping block located between the further clamping jaws and the trapezoidal shaped head, said clamping block having one face parallel to the adjacent face of the trapezoidal head and its opposite face parallel to the adjacent face of the further clamping jaws, such that movement of the trapezoidal head relative to the clamping blocks causes said clamping block to clamp the further locking jaws firmly in position after the further locking jaws have been applied to the rough casting through the elastomer body.

FRANK SKAY.

REFERENCES CITED

The following references are of record in the file of this patent:

UNITED STATES PATENTS

| Number | Name | Date |
|---|---|---|
| 927,628 | Young | July 13, 1909 |
| 1,500,264 | Peterson | July 8, 1924 |
| 2,115,094 | Bucklein | Apr. 26, 1938 |
| 2,463,263 | Gordon | Mar. 1, 1949 |